(12) United States Patent
Wang et al.

(10) Patent No.: US 11,334,307 B2
(45) Date of Patent: May 17, 2022

(54) IMAGE DISPLAY METHOD AND VIDEO PROCESSING DEVICE

(71) Applicant: PIXELHUE TECHNOLOGY LTD, Beijing (CN)

(72) Inventors: Huorong Wang, Shaanxi (CN); Jingguo Zong, Shaanxi (CN); Minfeng Ge, Beijing (CN)

(73) Assignee: PIXELHUE TECHNOLOGY LTD, Beijing (CN)

( * ) Notice: Subject to any disclaimer, the term of this patent is extended or adjusted under 35 U.S.C. 154(b) by 0 days.

(21) Appl. No.: 16/980,862

(22) PCT Filed: Nov. 19, 2018

(86) PCT No.: PCT/CN2018/116209
§ 371 (c)(1),
(2) Date: Sep. 15, 2020

(87) PCT Pub. No.: WO2020/062498
PCT Pub. Date: Apr. 2, 2020

(65) Prior Publication Data
US 2021/0208834 A1    Jul. 8, 2021

(30) Foreign Application Priority Data

Sep. 25, 2018 (WO) ................ PCT/CN2018/107297

(51) Int. Cl.
*G06F 3/147* (2006.01)
*G09G 5/373* (2006.01)
*G06F 3/14* (2006.01)

(52) U.S. Cl.
CPC ............ *G06F 3/1446* (2013.01); *G06F 3/147* (2013.01); *G09G 5/373* (2013.01); *G09G 2300/026* (2013.01); *G09G 2340/0407* (2013.01)

(58) Field of Classification Search
None
See application file for complete search history.

(56) References Cited

U.S. PATENT DOCUMENTS

2007/0159498 A1* 7/2007 Yang ..................... G06F 3/1446
345/660
2010/0001925 A1* 1/2010 Kim ..................... G06F 3/1446
345/1.3
(Continued)

FOREIGN PATENT DOCUMENTS

CN   103797787 A   5/2014
CN   104144302 A   11/2014
(Continued)

*Primary Examiner* — Aaron M Richer
(74) *Attorney, Agent, or Firm* — Gang Yu

(57) ABSTRACT

Disclosed are an image display method applied to a splice display screen included by splicing multiple screen bodies along a first direction, and a video processing device. The image display method may include: an output size in the first direction, of the splice display screen is determined according to resolutions and dot spacings in the first direction, of the multiple screen bodies; an input size in the first direction, of an input source is determined according to a resolution in the first direction, of the input source; an image scaling ratio in the first direction of the splice display screen is determined according to the input size and the output size; and display control parameters in the first direction, of the each screen body are determined according to the image scaling ratio.

11 Claims, 3 Drawing Sheets

(56) References Cited

U.S. PATENT DOCUMENTS

| | | | | |
|---|---|---|---|---|
| 2015/0205561 A1* | 7/2015 | Morton | ................ | G06F 3/1446 345/1.3 |
| 2016/0155410 A1* | 6/2016 | Nam | ..................... | G09G 5/005 715/745 |
| 2017/0192733 A1* | 7/2017 | Huang | ................ | G06F 3/1446 |

FOREIGN PATENT DOCUMENTS

| CN | 106201386 A | 12/2016 |
|---|---|---|
| CN | 106506987 A | 3/2017 |
| CN | 107027000 A | 8/2017 |
| CN | 107728986 A | 2/2018 |

\* cited by examiner

US 11,334,307 B2

IMAGE DISPLAY METHOD AND VIDEO PROCESSING DEVICE

TECHNICAL FIELD

The application relates to the field of display technologies, and in particular to an image display method applicable to a splice display screen and a video processing device.

BACKGROUND

A display screen, for example, a Light Emitting Diode (LED) display screen may be formed by combining and splicing screen bodies with different quantities and specifications due to a modularized design, to adapt to varieties of stage shapes. Resolutions, shapes, dot spacings and other parameters of different screen bodies may be different, thereby causing a great impact on image processing during a display control process. Especially, when multiple screen bodies with different resolutions and different dot spacings are spliced and combined as an irregular rectangular special-shaped screen, pictures are further required to be kept complete visually, without seam, tearing and other phenomena. Therefore, high requirements are proposed to a front-end video processing device.

In allusion to a splice display screen including two screen bodies with different resolutions, an image display method is to simply divide an input source into two parts according to the resolution of the screen body, and process with one or multiple video processing devices at present. The method may lead to inconsistent image scaling ratios of the different screens, cause discontinuous image, scaling ratio of the whole splice display screen, and even influence display continuity of pictures because an apparent dark line or an apparent bright line is formed due to a sharp change of the scaling ratio at a seam on a splicing edge of the screen body and an inconsistent image density is formed visually. In addition, if the two screen bodies are further the ones with different dot spacing specifications, the inconsistent image scaling ratio will be more serious, and visual effect will be worse in combination with the sharp change of the image scaling ratio at the seam on the splicing edge of the screen body.

SUMMARY

In allusion to the abovementioned problems, the embodiments of the application provide an image display method applicable to a splice display screen and a video processing device, as to solve the problem that pictures of the splice display screen are displayed discontinuously.

On one hand, the embodiment of the application provides an image display method, which is applied to a splice display screen included by splicing multiple screen bodies along a first direction. The image display method may include: an output size in the first direction, of the splice display screen is determined according to resolutions and dot spacings in the first direction, of the multiple screen bodies; an input size in the first direction, of an input source is determined according to a resolution in the first direction, of the input source; an image scaling ratio in the first direction, of the splice display screen is determined according to the input size and the output size; and display control parameters in the first direction, of the each screen body are determined according to the image scaling ratio, wherein the display control parameters may include a starting pixel, the number of pixels and an initial phase in the first direction, of image data intercepted by the each screen body from the input source.

In an embodiment of the application, the resolutions in the first direction, of the multiple screen bodies are different, the dot spacings in the first direction, of the multiple screen bodies are identical, image scaling ratios in the first direction, of the multiple screen bodies are identical and equal to the image scaling ratio in the first direction, of the splice display screen.

In an embodiment of the application, the resolutions in the first direction, of the multiple screen bodies are different, the dot spacings in the first direction, of the multiple screen bodies are different, the image scaling ratios in the first direction, of the multiple screen bodies are identical and equal to the image scaling ratio in the first direction, of the splice display screen.

In an embodiment of the application, the output size meets the following formula:

$$D'_{out\_total} = \left(\sum_{i=0}^{M-1} H_{out\_i} \times P_i\right) - P_{M-1},$$

where M is the number of the multiple screen bodies, $D_{out\_total}'$ is the output size in the first direction of the splice display screen, $H_{out\_i}$ is a resolution in the first direction, of an ith screen body of the multiple screen bodies, p is a dot spacing in the first direction, of the ith screen body, $P_{M-1}$ is a dot spacing in the first direction, of an (M-1)th screen body. The input size meets the following formula: $D_{in\_total}'=H_{in\_total}-1$, where $D_{in\_total}'$ is the input size in the first direction, of the input source, $H_{in\_total}$ is the resolution in the first direction, of the input source. The image scaling ratio meets the following formula:

$$Ratio'_{total} = \frac{D'_{in\_total}}{D'_{out\_total}},$$

where $Ratio_{total}'$ is the image scaling ratio in the first direction, of the splice display screen.

In an embodiment of the application, the step that the display control parameters in the first direction, of the each screen body are determined according to the image scaling ratio may include: the display control parameters of any screen body of the multiple screen body except a starting screen body are calculated by the following formula:

StartPos$_i$=EndPos$_{i-1}$+$P_{i-1}$×Ratio$_{total}'$

CropHStart$_i$=⌊StartPos$_i$⌋

EndPos$_i$=StartPos$_i$+($H$out$_i$−1)×$P_i$×Ratio$_{total}'$

CropHin$_i$=⌈EndPos$_i$⌉−⌊StartPos$_i$⌋+1

InitPhase$_i$={StartPos$_i$} where i is a natural number, StartPos$_i$ is a starting pixel position in the first direction, of the ith screen body of the multiple screen bodies except the starting screen body, EndPos$_{i-1}$ is an ending pixel position in the first direction, of an (i−1)th screen body before the ith screen body, is a dot spacing in the first direction, of the (i−1)th screen body, Ratio$_{total}'$ is the image scaling ratio in the first direction, of the splice display screen, CropHstart$_i$ is a starting pixel in the display control parameters in the first direction, of the ith screen body, $EndPos_i$ is an ending pixel position in the first direction, of the ith screen body, $Hout_i$ is a resolution in the first direction, of the ith screen body, $P_i$ is a dot spacing in the first direction, of the ith screen body, $CropHin_i$ is the number of pixels in the display control parameters in the first direction, of the ith screen body, $InitPhase_i$ is an initial phase in the display control parameters in the first direction, of the ith screen body, $\lfloor \ \rfloor$ is a round-down operation, $\lceil \ \rceil$ is a round-up operation, $\{ \ \}$ is an operation of taking a decimal part.

In an embodiment of the application, the first direction includes a horizontal direction or a vertical direction of the splice display screen.

On another hand, an image display method provided by the embodiment of the application is applied to a splice display screen included by splicing multiple screen bodies along a first direction. The image display method may include: an output size in the first direction, of the splice display screen is determined according to specification parameters of the multiple screen bodies, wherein, the specification parameters of the multiple screen bodies may include resolutions, and the resolutions in the first direction, of the multiple screen bodies are different; an input size in the first direction, of an input source is determined according to a resolution of the input source; an image scaling ratio in the first direction, of the splice display screen is determined according to the input size and the output size, so that image scaling ratios in the first direction, of the multiple screen bodies are equal to the image scaling ratio in the first direction, of the splice display screen; and display control parameters of the each screen body are determined according to the image scaling ratio in the first direction, of the splice display screen.

In an embodiment of the application, the step that the display control parameters of the each screen body are determined according to the image scaling ratio in the first direction, of the splice display screen may include: display control parameters in the first direction, of a second screen body of the multiple screen bodies except a starting screen body are determined, including: a starting pixel position in the first direction, of the second screen body is determined according to an ending pixel position and a dot spacing of one screen body before the second screen body and the image scaling ratio in the first direction, of the splice display screen, and the starting pixel position is rounded down to obtain a starting pixel in the display control parameters in the first direction, of the second screen body, an ending pixel position in the first direction, of the second screen body is determined according to the starting pixel position, a resolution and a dot spacing in the first direction, of the second screen body and the image scaling ratio of the splice display screen in the first direction; the number of pixels in the display control parameters in the first direction, of the second screen body is determined according to the ending pixel position and the starting pixel position in the first direction, of the second screen body; and a decimal part is taken for the starting pixel position in the first direction, of the second screen body to obtain an initial phase in the display control parameters in the first direction, of the second screen body.

In an embodiment of the application, the first direction includes a horizontal direction or a vertical direction of the splice display screen.

In an embodiment of the application, the image display method may further include: the each screen body intercepts corresponding image data from the input source according to the respective image scaling ratio and the display control parameters, and implements scaling for the image data to allow the screen body to display.

Still on another hand, a video processing device provided by the embodiment of the application is configured to drive a splice display screen included by splicing multiple screen bodies along a first direction. The video processing device may include a processor module, and the processor module stores a program code and may include a microcontroller. The microcontroller implements the program code to: determine according to resolutions and dot spacings in the first direction, of the multiple screen bodies, an output size in the first direction, of the splice display screen; determine according to a resolution in the first direction, of the input source, an input size in the first direction, of an input source; determine according to the input size and the output size, an image scaling ratio in the first direction, of the splice display screen, and determine according to the image scaling ratio, display control parameters in the first direction, of the each screen body.

In an embodiment of the application, the display control parameters in the first direction, of the each screen body may include a starting pixel, the number of pixels and an initial phase in the first direction, of image data intercepted by the screen body from the input source.

In an embodiment of the application, the step that the display control parameters of the each screen body are determined according to the image scaling ratio may include: display control parameters in the first direction, of a second screen body of the multiple screen body except a starting screen body are determined, including: a starting pixel position in the first direction, of the second screen body is determined according to an ending pixel position and a dot spacing of one screen body before the second screen body and the image scaling ratio in the first direction, of the splice display screen; the starting pixel position is rounded down to obtain a starting pixel in the display control parameters in the first direction, of the second screen body; an ending pixel position in the first direction, of the second screen body is determined according to the starting pixel position, a resolution and a dot spacing in the first direction, of the second screen body and the image scaling ratio in the first direction, of the splice display screen; the number of pixels in the display control parameters in the first direction, of the second screen body is determined according to the ending pixel position and the starting pixel position in the first direction, of the second screen body, and a decimal part is taken for the starting pixel position in the first direction, of the second screen body to obtain an initial phase in the display control parameters in the first direction of the second screen body.

One of the abovementioned technical solutions has the following advantages or beneficial effects: in the embodiments of the application, the image scaling ratio in a certain direction, of the splice display screen is determined according to the resolutions and the dot spacings of the multiple screen bodies spliced along the direction in the splice display screen and the resolution of the input source, and the display control parameters of the multiple screen bodies are obtained according to the image scaling ratio, in this way the image scaling ratios of the multiple screen bodies are identical, and accordingly the problem that the pictures of the splice display screen are displayed discontinuously is solved.

BRIEF DESCRIPTION OF THE DRAWINGS

In order to more clearly describe the technical solutions of the embodiments of the application, drawings required to be used in the embodiment description will be briefly introduced below. It is apparent that the drawings in the description below are merely some embodiments of the application. Other drawings may further be obtained by those of ordinary skill in the art according to these drawings without creative work.

DETAILED DESCRIPTION OF THE EMBODIMENTS

The technical solutions in the embodiments of the application will be clearly and completely described below in combination with drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

Figure 1:
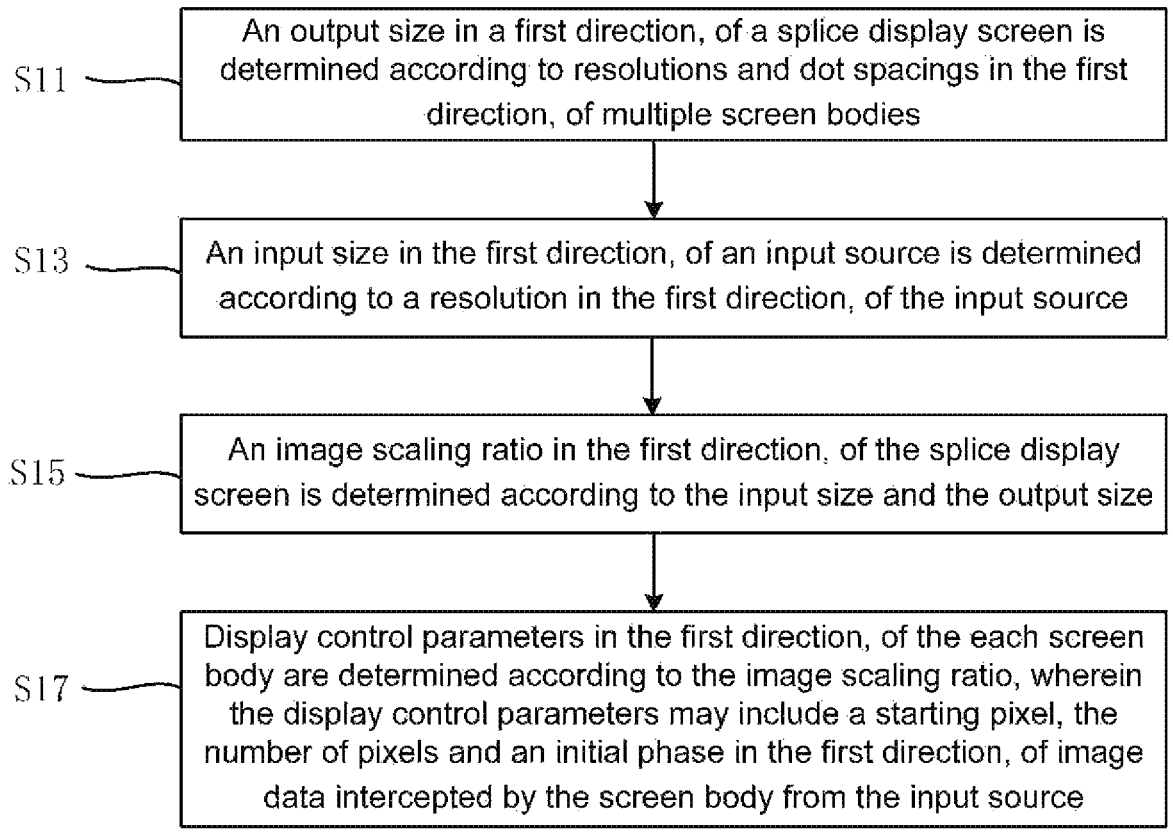
FIG. 1 is a flow chart of an image display method of a splice display screen in an embodiment of the application.

Referring to FIG. 1, it is a flow chart of an image display method provided by an embodiment of the application. The image display method may include the following steps.

S11, an output size in a first direction, of a splice display screen is determined according to resolutions and dot spacings in the first direction, of multiple screen bodies.

S13, an input size in the first direction, of an input source is determined according to a resolution in the first direction, of the input source.

S15, an image scaling ratio in the first direction, of the splice display screen is determined according to the input size and the output size.

S17, display control parameters in the first direction, of the each screen body are determined according to the image scaling ratio, wherein, the display control parameters may include a starting pixel, the number of pixels and an initial phase in the first direction, of image data intercepted by the screen body from the input source.

In order to facilitate understanding of the application, all steps of the image display method of the embodiment will be described below in detail in combination with FIG. 1 and FIG. 2.

The image display method may be applied to the splice display screen included by splicing the multiple screen bodies along the first direction. The multiple screen bodies here, for example, may be Light Emitting Diode (LED) display screens or other types of display screens. The multiple screen bodies are typical rectangular display screens. In addition, the first direction, for example, may be a horizontal direction or a vertical direction. Of course, there are other splicing directions as well. Specification parameters of the multiple screen bodies are different typically, and the specification parameters of the screen body, for example, may include the resolution and the dot spacing of the screen body. Herein, the resolutions of the different screen bodies are usually different (of course, the identical resolution of the different screen bodies is not excluded), and the dot spacings may be or may not be the same. The resolution is the number of the pixels that the screen body includes in the first direction. The dot spacing is a distance between centers of two adjacent pixels in the first direction, of the screen body. In addition, the resolution and the dot spacing of the screen body is directional as well, namely, the resolution and the dot spacing of the screen body may be or may not be the same in different directions, for example, the horizontal direction and the vertical direction. The multiple screen bodies need to intercept and display corresponding image data from the input source according to a positions of the multiple screen bodies in the splice display screen, so that the splice display screen displays a complete picture. Therefore, before intercepting the image data, the image scaling ratios of the multiple screen bodies and the display control parameters for intercepting the image data need to be determined, wherein the display control parameters, for example, include the starting pixel, the number of pixels and the initial phase of the image data of the multiple screen bodies in the image data of the input source.

First, the output size in the first direction, of the splice display screen is determined according to the resolutions and the dot spacings in the first direction, of the multiple screen bodies. The output size here may be a virtual size rather than an actual physical size Suppose the splice display screen may be formed by splicing M (M is a natural number greater than 1) screen bodies along the first direction, for example, the horizontal direction, a serial number of the each screen, for example, may be 0, 1, 2, . . . , (M−1), the output size $D_{out\_total\_1}'$ in the first direction meets the following formula:

$$D'_{out\_total} = \left(\sum_{i=0}^{M-1} H_{out\_i} \times P_i\right) - P_{M-1} \quad (1)$$

where $D_{out\_total}'$ is the output size in the first direction, of the splice display screen, $H_{out\_i}$ is a resolution in the first direction, of an ith screen body of the multiple screen bodies, $P_i$ is a dot spacing in the first direction, of the ith screen body, and $P_{M-1}$ is a dot spacing in the first direction, of an (M−1)th screen body (a last screen body).

Second, the input size in the first direction, of the input source is determined according to the resolution in the first direction, of the input source. The input source here, for example, may be DP, HDMI, DVI and other video source images, for providing the image data. Generally, the dot spacing of the input source in the horizontal direction and the vertical direction is "1" unit by default. According to the input size in the first direction, of the input source, the following formula is satisfied:

$$D_{in\_total}' = H_{in\_total} - 1 \quad (2)$$

where $D_{in\_total}'$ is the input size in the first direction, of the input source, and $H_{in\_total}$ is the resolution in the first direction, of the input source. From the Formula (2), the input size in the first direction, of the input source may be interpreted as a sum of dot spacings between all pixels in the first direction, of the input source.

Then, the image scaling ratio in the first direction, of the splice display screen is determined according to the input size and the output size. As an example embodiment, the image scaling ratio in the first direction, of the splice display screen meets the following formula:

$$Ratio'_{total} = \frac{D'_{in\_total}}{D'_{out\_total}} \qquad (3)$$

where $Ratio_{total}'$ is the image scaling ratio in the first direction, of the splice display screen. If a user intends to keep the displayed pictures with a visually consistent density and cause no bright line or dark line and other phenomena at a seam on a splicing edge after calculating the image scaling ratio in the first direction, of the splice display screen, the multiple screen bodies need to have the identical image scaling ratio in the first direction, and the image scaling ratios of the multiple screen bodies needs to be respectively the same as the image scaling ratio of the splice display screen. Of course, the dot spacings in the first direction, of the multiple screen bodies may be or may not be the same.

Finally, the display control parameters in the first direction, of the each screen body are determined according to the image scaling ratio. The display control parameters here may include the starting pixel, the number of the pixels and the initial phase in the first direction, of the image data intercepted by the screen body from the input source. As an example embodiment, the display control parameters of the each screen body are determined one by one. In the first direction, a 0th screen body of the multiple screen bodies is a starting screen body (namely, a serial number of the starting screen body is 0). For example, in the horizontal direction, the starting screen body is a leftmost screen body, and in the vertical direction, the starting screen body is an uppermost screen body. If the display control parameters of the screen body are intended to be determined, a starting pixel position and an ending pixel position of the screen body need to be calculated first.

As for the starting screen body, the display control parameters of the starting screen body (the 0th screen body) are calculated with the following formula.

$$StartPos_0 = 0, \qquad (4)$$

$$EndPos_0 = StartPos_0 + (Hout_0 - 1) \times P_0 \times Ratio_{total}', \qquad (5)$$

$$CropHStart_0 = \lfloor StartPos_0 \rfloor, \qquad (6)$$

$$CropHin_0 = \lceil EndPos_0 \rceil - \lfloor StartPos_0 \rfloor + 1, \qquad (7)$$

$$InitPhase_0 = \{StartPos_0\}, \qquad (8)$$

where $StartPos_0$ is the starting pixel position in the first direction, of the starting screen body, $EndPos_0$ is the end pixel position in the first direction, of the starting screen body, $Hout_0$ is a resolution in the first direction, of the starting screen body, $P_0$ is a dot spacing in the first direction, of the starting screen body, $Ratio_{total}'$ is the image scaling ratio in the first direction, of the splice display screen, $CropHStart_0$ is a starting pixel in the display control parameters in the first direction of the starting screen body, $CropHin_0$ is the number of pixels in the display control parameters in the first direction, of the starting screen body, $InitPhase_0$ is an initial phase in the display control parameters in the first direction, of the starting screen body, $\lfloor \ \rfloor$ indicates a round-down operation, for example, $\lfloor 4.2 \rfloor = 4$, $\lceil \ \rceil$ indicates a round-up operation, for example, $\lceil 4.2 \rceil = 5$, $\{ \ \}$ indicates an operation of taking a decimal part, for example, $\{4.2\} = 0.2$. It is worth mentioning here, the initial phase $InitPhase_0$ in the first direction, of the starting screen body is usually set to 0.

When the display control parameters in the first direction, of the starting screen body are obtained, the display control parameters in the first direction, of a second screen body (any screen body) of the multiple screen bodies except the starting screen body may be calculated. As an example embodiment, the following calculation steps may be included.

(1) A starting pixel position in the first direction, of the second screen body is determined according to an ending pixel position and a dot spacing of one screen body before the second screen body and the image scaling ratio in the first direction, of the splice display screen, and the starting pixel position is rounded down to obtain a starting pixel in the display control parameters in the first direction, of the second screen body. Further, the starting pixel position in the first direction, of the second screen body meets the following formula:

$$StartPos_i = EndPos_{i-1} + P_{i-1} \times Ratio_{total}' \qquad (9)$$

where i is a natural number, $StartPos_i$ is a starting pixel position in the first direction, of the ith screen body (the second screen body) of the multiple screen bodies except the starting screen body, $EndPos_{i-1}$ is an ending pixel position in the first direction, of an (i−1)th screen body (the screen body before the second screen body) before the ith screen body, $P_{i-1}$ is a dot spacing in the first direction, of the (i−1)th screen body (the screen body before the second screen body), $Ratio_{total}'$ is the image scaling ratio in the first direction, of the splice display screen.

The starting pixel in the display control parameters in the first direction, of the second screen body meets the following formula:

$$CropHStart_i = \lfloor StartPos_i \rfloor \qquad (10)$$

where i is a natural number, $StartPos_i$ is the starting pixel position in the first direction, of the ith screen body (the second screen body) of the multiple screen bodies except the starting screen body, and $CropHStart_i$ is a starting pixel in the display control parameters in the first direction, of the ith screen body (the second screen body).

(2) An ending pixel position in the first direction, of the second screen body is determined according to the starting pixel position, a resolution and a dot spacing in the first direction, of the second screen body and the image scaling ratio in the first direction, of the splice display screen. Further, the ending pixel position in the first direction, of the second screen body meets the following formula:

$$EndPos_i = StartPos_i + (Hout_i - 1) \times P_i \times Ratio_{total}' \qquad (11)$$

where i is a natural number, $StartPos_i$ is the starting pixel position in the first direction, of the ith screen body (the second screen body) of the multiple screen bodies except the starting screen body, $EndPos_i$ is an ending pixel position in the first direction, of the ith screen body (the second screen body), $Hout_i$ is a resolution in the first direction, of the ith screen body (the second screen body), $P_i$ is a dot spacing in the first direction, of the ith screen body (the second screen body).

(3) The number of pixels in the display control parameters in the first direction, of the second screen body is determined according to the ending pixel position and the starting pixel position in the first direction, of the second screen body. Further, the number of the pixels in the display control parameters in the first direction, of the second screen body meets the following formula:

$$CropHin_i = \lceil EndPos_i \rceil - \lfloor StartPos_i \rfloor + 1 \qquad (12)$$

where i is a natural number, StartPos$_i$ is the starting pixel position in the first direction, of the ith screen body (the second screen body) of the multiple screen bodies except the starting screen body, EndPos$_i$ is the ending pixel position in the first direction, of the ith screen body (the second screen body), CropHin$_i$ is the number of pixels in the display control parameters in the first direction of the ith screen body (the second screen body).

(4) A decimal part is taken for the starting pixel position in the first direction, of the second screen body to obtain an initial phase in the display control parameters in the first direction, of the second screen body. Further, the initial phase in the display control parameters in the first direction, of the second screen body meets the following formula:

$$\text{InitPhase}_i = \{\text{StartPos}_i\} \tag{13}$$

where i is a natural number, StartPos$_i$ is the starting pixel position in the first direction, of the ith screen body (the second screen body) of the multiple screen bodies except the starting screen body, and InitPhase$_i$ is an initial phase in the display control parameters in the first direction, of the ith screen body (the second screen body).

When the image scaling ratio of the splice display screen and the display control parameters of the corresponding image data intercepted by the multiple screen bodies from the input source are obtained, the each screen body intercepts the corresponding image data from the input source according to the respective starting pixel and the respective number of the pixels in the display control parameters, implements scaling for the image data according to the respective image scaling ratio, and adjusts an initial position according to the initial phase in the display control parameters to allow the display screen to display.

The embodiment will describe an image display method of a splice display screen of the embodiment below by taking a situation of the splice display screen formed by splicing two screen bodies with different resolutions and different dot spacings in a horizontal direction as an example. As shown in FIG. 2, circles 0-14 in the figure indicate a resolution H$_{in\_total}$ of an input source in the horizontal direction and is 15, and a dot spacing is 1 by default. A resolution Hout$_0$ of a screen body L0 in the horizontal direction is 4 (the number of start-shaped signs in the corresponding screen body L0 is 4), and a dot spacing P$_0$ is 3. A resolution Hout$_1$ of a screen body L1 in the horizontal direction is 5 (the number of start-shaped signs in the corresponding screen body L1 is 5), and a dot spacing P$_i$ is 4. In order to make sure that pictures displayed by the screen bodies L0 and L1 are kept with a consistent density and continuity in the horizontal direction, the image display method provided by the embodiment of the application is taken to obtain the image scaling ratio of the splice display screen and the display control parameters of the screen bodies L0 and L1. The specific process is as follows.

(1) An output size D$_{out\_total}'$ in the horizontal direction, of the splice display screen is calculated according to the resolutions and the dot spacings in the horizontal direction, of the screen bodies L0 and L1.

$$D'_{out\_total} = \left(\sum_{i=0}^{M-1} H_{out\_i} \times P_i\right) - P_{M-1} = ((4 \times 3) + (5 \times 4)) - 4 = 28$$

(2) An input size D$_{in\_total}'$ in the horizontal direction, of the input source is calculated according to a resolution in the horizontal direction, of the input source.

$$D_{in\_total}' = H_{in\_total} - 1 = 15 - 1 = 14$$

(3) An image scaling ratio Ratio$_{total}'$ in the horizontal direction, of the splice display screen is calculated according to the input size D$_{in\_total}'$ and the output size D$_{out\_total}'$.

$$Ratio'_{total} = \frac{D'_{in\_total}}{D'_{out\_total}} = \frac{14}{28} = 0.5.$$

(4) Display control parameters of the screen bodies L0 and L1 are determined according to an image scaling ratio Ratio$_{total\_1}'$ in the horizontal direction.

As for the screen body L0, the screen body L0 is the leftmost screen body in the horizontal direction, namely, the starting screen body, therefore a starting pixel position in the horizontal direction of the screen body L0 is equal to 0, i.e., StartPos$_0$=0.

An ending pixel position EndPos$_0$ in the horizontal direction, of the screen body L0 is:

$$\text{EndPos}_0 = \text{StartPos}_0 + (H\text{out}_0 - 1) \times P_0 \times \text{Ratio}_{total}' = 0 + (4-1) \times 3 \times 0.5 = 4.5.$$

An starting pixel CropHStart$_0$ in the horizontal direction, of the screen body L0 is:

$$\text{CropHStart}_0 = \lfloor \text{StartPos}_0 \rfloor = \lfloor 0 \rfloor = 0.$$

An initial phase InitPhase$_0$ in the horizontal direction, of the screen body L0 is:

$$\text{InitPhase}_0 = \{\text{StartPos}_0\} = \{0\} = 0.$$

The number of pixels CropHin$_0$ in the horizontal direction, of the screen body L0 is:

$$\text{CropHin}_0 = \lceil \text{EndPos}_0 \rceil - \lfloor \text{StartPos}_0 \rfloor + 1 = \lceil 4.5 \rceil - \lfloor 0 \rfloor + 1 = 6.$$

As for the screen body L1, the screen body L1 is not the starting screen body, namely, the screen body not the starting screen body, therefore:

a starting pixel position StartPos$_1$ in the horizontal direction, of the screen body L1:

$$\text{StartPos}_i = \text{EndPos}_{i-1} + P_{i-1} \times \text{Ratio}_{total}' = 4.5 + 3 \times 0.5 = 6.$$

A starting pixel CropHStart$_1$ in the horizontal direction, of the screen body L1 is:

$$\text{CropHStart}_i = \lfloor \text{StartPos}_i \rfloor = \lfloor 6 \rfloor = 6.$$

An ending pixel position EndPos$_1$ in the horizontal direction, of the screen body L1 is:

$$\text{EndPos}_i = \text{StartPos}_i + (H\text{out}_i - 1) \times P_i \times \text{Ratio}_{total}' = 6 + (5-1) \times 4 \times 0.5 = 14.$$

The number of pixels CropHin$_1$ in the horizontal direction, of the screen body L1 is:

$$\text{CropHin}_i = \lceil \text{EndPos}_i \rceil - \lfloor \text{StartPos}_i \rfloor + 1 = \lceil 14 \rceil - \lfloor 6 \rfloor + 1 = 9.$$

An initial phase InitPhase$_1$ in the horizontal direction, of the screen body L1 is:

$$\text{InitPhase}_i = \{\text{StartPos}_i\} = \{6\} = 0.$$

The screen bodies L0 and L1 intercept corresponding image data from the input source according to the respective image scaling ratios and the display control parameters, and implement scaling for the image data to allow the screen body to display.

To sum up, the embodiment of the application determines the image scaling ratio of the splice display screen according to the resolutions and the dot spacings of the multiple screen bodies spliced along the certain direction in the splice display screen, in this way the image scaling ratios of the multiple screen bodies are consistent and are respectively equal to the image scaling ratio of the splice display screen. In addition, the display control parameters of the each screen body, such as the initial phase, is calculated according to the image scaling ratio to set and adjust the starting pixel of the screen body to an appropriate position, in this way the problem that the pictures displayed by the images have the inconsistent density is avoided. Accordingly, contents displayed by the multiple screen bodies can be spliced without seam, the bright line or the dark line generated on the splicing edge is eliminated, and continuous display of the images is ensured. In addition, the image display method of the splice display screen provided by the embodiment of the application is not only applicable to a splicing scene of regular screen bodies with identical resolution and identical dot spacing, but a splicing scene of irregular screen bodies with identical dot spacing and different resolutions and a splicing scene of irregular screen bodies with different dot spacings and different resolutions, and accordingly range of application of a product is expanded.

Figure 3:
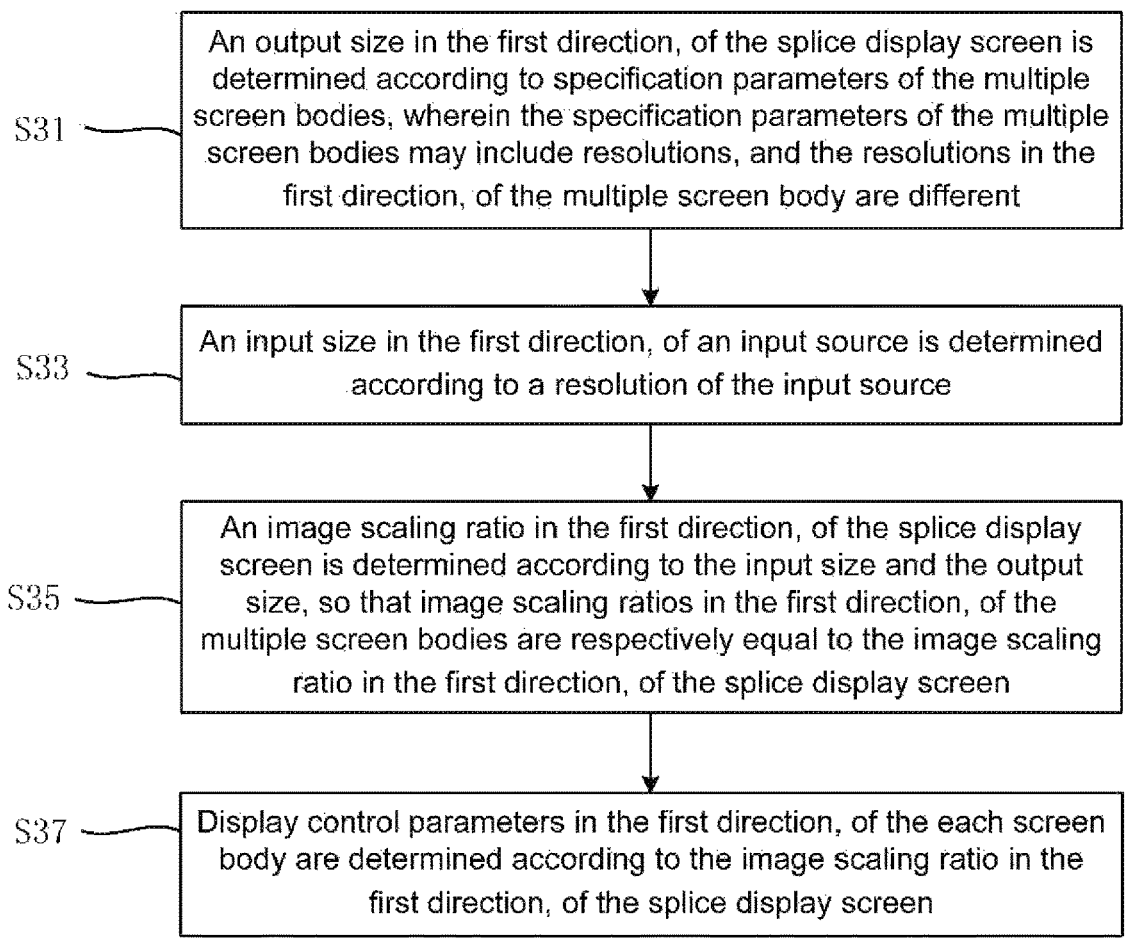
FIG. 3 is a flow chart of an image display method of a splice display screen in another embodiment of the application.

By referring to FIG. 3, it is a flow chart of an image display method of a splice display screen provided by another embodiment of the application. The image display method of the splice display screen is applied to the splice display screen included by splicing multiple screen bodies along a first direction. The image display method of the splice display screen may include the following steps.

S31, an output size in the first direction of the splice display screen is determined according to specification parameters of the multiple screen bodies, wherein, the specification parameters of the multiple screen bodies may include resolutions, and the resolutions in the first direction of the multiple screen body are different.

S33, an input size in the first direction of an input source is determined according to a resolution of the input source.

S35, an image scaling ratio in the first direction of the splice display screen is determined according to the input size and the output size, so that image scaling ratios in the first direction of the multiple screen bodies are respectively equal to the image scaling ratio in the first direction of the splice display screen.

S37, display control parameters in the first direction, of the each screen body are determined according to the image scaling ratio in the first direction, of the splice display screen.

Figure 2:
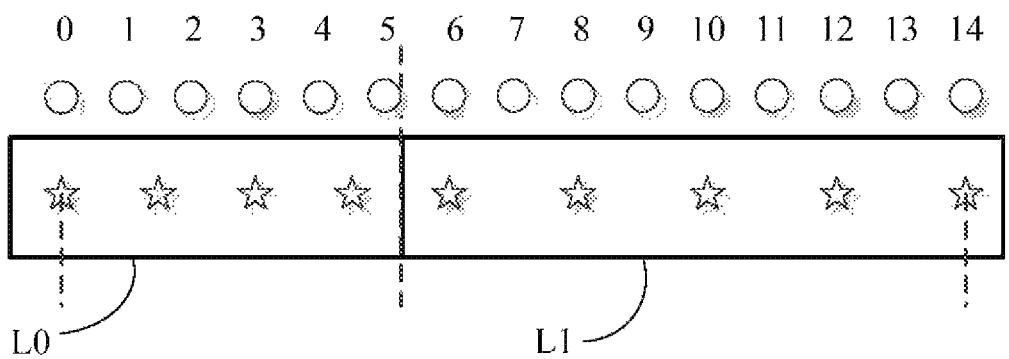
FIG. 2 is a local structure diagram of a splice display screen formed by splicing two screen bodies having different resolutions and dot spacings along a horizontal direction in an embodiment of the application.

The abovementioned embodiments related to FIG. 1 and FIG. 2 may be used for reference in terms of a concrete implementation process and technical effect of an embodiment related to FIG. 3 of the application, and therefore they will not be elaborated here.

Figure 4:
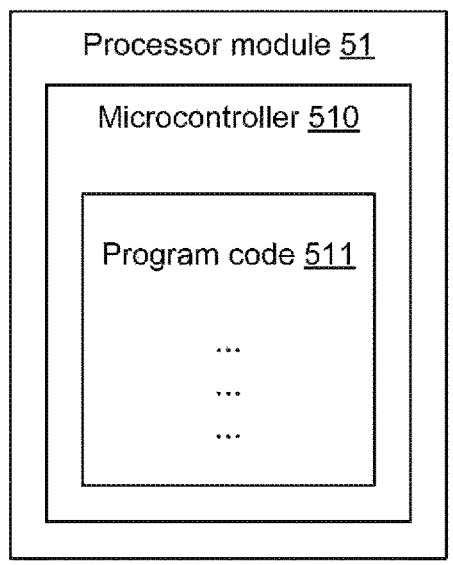
FIG. 4 is a structure diagram of a video processing device in still another embodiment of the application.

As shown in FIG. 4, still another embodiment of the application provides a video processing device 50. The video processing device 50 is configured to drive a splice display screen included by splicing multiple screen bodies along a first direction. The video processing device 50 may include a processor module 51. The processor module 51 may include a microcontroller 510. The microcontroller 510, for example, may be an MCU (such as an STM32F207 type chip) or other controllers. A program code 511 is stored in the microcontroller 510 (namely, the program code 511 is stored in an internal memory of the microcontroller 510). The microcontroller 510 implements the program code 511, for: determining according to resolutions and dot spacings in the first direction of the multiple screen bodies, an output size in the first direction of the splice display screen; determining according to a resolution in the first direction, of the input source, an input size in the first direction, of an input source; determining according to the input size and the output size, an image scaling ratio in the first direction, of the splice display screen; and determining according to the image scaling ratio, display control parameters in the first direction, of the each screen body. The display control parameters in the first direction of the screen body may include a starting pixel, the number of pixels and an initial phase in the first direction, of image data intercepted by the screen body from the input source.

In other embodiments of the application, as an alternative, the processor module 51 may include the microcontroller 510 and a memory externally connected to the microcontroller 510. The memory, for example, may be a non-volatile memory, such as a FLASH memory. The program code 511 is stored in the memory and may be implemented by the microcontroller 510, for: determining according to the resolutions and the dot spacings in the first direction, of the multiple screen bodies, the output size in the first direction, of the splice display screen; determining according to the resolution in the first direction, of the input source, the input size in the first direction of the input source; determining according to the input size and the output size, the image scaling ratio in the first direction of the splice display screen; and determining according to the image scaling ratio, display control parameters in the first direction, of the each screen body. The display control parameters in the first direction, of the screen body may include the starting pixel, the number of pixels and the initial phase in the first direction, of the image data intercepted by the screen body from the input source.

Figure 5:
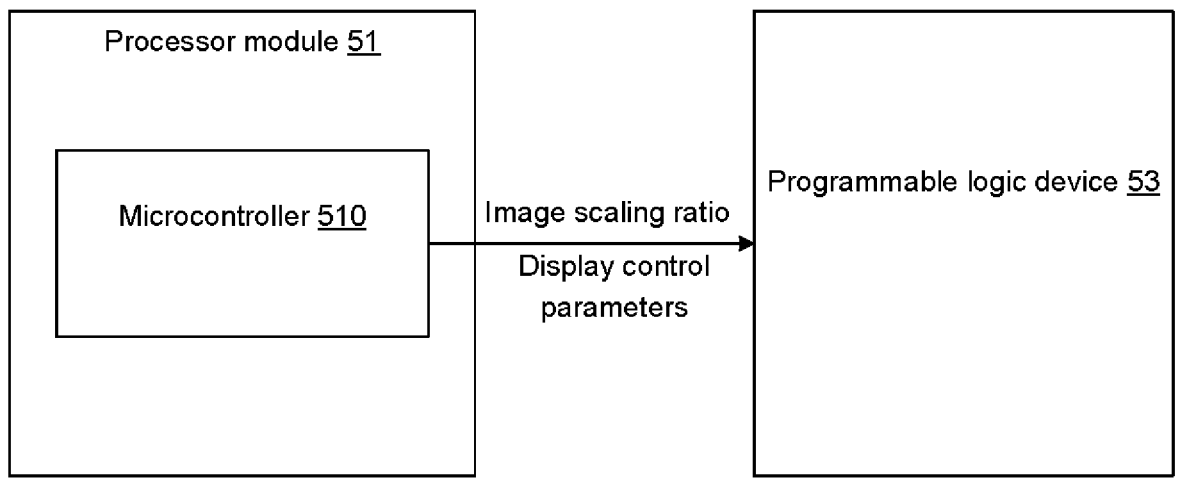
FIG. 5 is a structure diagram of a video processing device in other embodiments of the application.

In addition, as shown in FIG. 5, a video processing device 50 may further include a programmable logic device 53. The programmable logic device 53 is connected with a microcontroller 510. The microcontroller 510 transmits an image scaling ratio obtained after implementing a program code 511, of a splice display screen and the display control parameters of multiple screen bodies to the programmable logic device 53, so that the programmable logic device 53 intercepts corresponding image data from an input source and implements scaling for the image data to allow the multiple screen bodies to display.

The abovementioned embodiment may be used for reference in terms of concrete implementation processes and technical effects of the embodiments related to FIG. 4 and FIG. 5 of the application, and they will not be elaborated here.

In addition, various elements between the different embodiments of the application may be combined randomly, and any combinations without departing from the idea of the application should likewise be regarded as the contents disclosed by the application.

In some embodiments provided by the application, it should be understood that the disclosed system, apparatus and method may be implemented by other modes. For example, the apparatus embodiment described above is only schematic, and for example, division of the units is only logic function division, and other division modes may be adopted during practical implementation. For example, multiple units or components may be combined or integrated into another system, or some features may be neglected or not implemented. In addition, coupling, or direct coupling or communication connection between the displayed or discussed components may be indirect coupling or communication connection implemented through some interfaces, apparatuses or units, and the direct coupling or communication connection of the apparatuses or the units may be electrical and mechanical or adopt other forms.

The units described as separate parts may or may not be physically separated, and parts displayed as units may or may not be physical units, namely, may be located in the same place, or may also be distributed to multiple network units. Part or all of the units may be selected to achieve the purpose of the solutions of the embodiments according to the practical requirements.

In addition, each function unit in each embodiment of the application may be integrated into a processing unit, or each unit may also exist independently and physically, and two or more than two units may also be integrated into one unit. The integrated unit may be implemented in a hardware form, and as an alternative, in form of hardware and software function unit.

Finally, it is to be noted that the abovementioned embodiments are used for describing the technical solutions of the application only rather than limiting the application. Although the application is described in detail by using the previous embodiments for reference, it should be understood that those of ordinary skill in the art still may modify the technical solutions recorded in each of the previous embodiments, or implement equivalent replacements for part of the technical features, and these modifications or replacements should not make essence of the corresponding technical solution break away from the spirit and scope of the technical solution of the each embodiment of the application.

What is claimed is:

1. An image display method, which is applied to a splice display screen comprised by splicing multiple screen bodies along a first direction, the image display method comprising:
   determining according to resolutions and dot spacings in the first direction, of the multiple screen bodies, an output size in the first direction, of the splice display screen;
   determining an input size in the first direction, of an input source, according to a resolution in the first direction, of the input source;
   determining according to the input size and the output size, an image scaling ratio in the first direction, of the splice display screen; and
   determining according to the image scaling ratio, display control parameters in the first direction, of each screen body, wherein the display control parameters comprise a starting pixel, the number of pixels and an initial phase in the first direction, of image data intercepted by the each screen body from the input source;
   wherein the image scaling ratios in the first direction, of the multiple screen bodies are identical and equal to the image scaling ratio in the first direction, of the splice display screen;
   wherein determining according to the image scaling ratio, the display control parameters in the first direction of the each screen body comprises:
   calculating by a following formula, the display control parameters of any screen body of the multiple screen bodies except a starting screen body:

$StartPos_i = EndPos_{i-1} + P_{i-1} \times Ratio_{total}'$, $CropHStart_i = \lfloor StartPos_i \rfloor$, $EndPos_i = StartPos_i + (Hout_i - 1) \times P_i \times Ratio_{total}'$, $CropHin_i = \lceil EndPos_i \rceil - \lfloor StartPos_i \rfloor + 1$, $InitPhase_i = \{StartPos_i\}$, where i is a natural number, $StartPos_i$ is a starting pixel position in the first direction, of the ith screen body of the multiple screen bodies except the starting screen body, $EndPos_{i-1}$ is an ending pixel position in the first direction, of an (i−1)th screen body before the ith screen body, $P_{i-1}$ is a dot spacing in the first direction, of the (i−1)th screen body, $Ratio_{total}'$ is the image scaling ratio in the first direction, of the splice display screen, $CropHStart_i$ is a starting pixel in the display control parameters in the first direction, of the ith screen body, $EndPos_i$ is an ending pixel position in the first direction, of the ith screen body, $Hout_i$ is a resolution in the first direction, of the ith screen body, $P_i$ is a dot spacing in the first direction, of the ith screen body, $CropHin_i$ is the number of pixels in the display control parameters in the first direction, of the ith screen body, $InitPhase_i$ is an initial phase in the display control parameters in the first direction, of the ith screen body, $\lfloor \ \rfloor$ is a round-down operation, $\lceil \ \rceil$ is a round-up operation, and $\{ \ \}$ is an operation of taking a decimal part.

2. The image display method as claimed in claim 1, wherein the resolutions in the first direction, of the multiple screen bodies are different, the dot spacings in the first direction, of the multiple screen bodies are identical.

3. The image display method as claimed in claim 1, wherein the resolutions in the first direction, of the multiple screen bodies are different, the dot spacings in the first direction, of the multiple screen bodies are different, and the image scaling ratios in the first direction, of the multiple screen bodies are identical and equal to the image scaling ratio in the first direction, of the splice display screen.

4. The image display method as claimed in claim 1, wherein,
the output size meets a following formula:

$$D'_{out\_total} = \left( \sum_{i=0}^{M-1} H_{out\_i} \times P_i \right) - P_{M-1},$$

where M is the number of the multiple screen bodies, $D_{out\_total}'$ is the output size in the first direction, of the splice display screen, $H_{out\_i}$ is a resolution in the first direction, of an ith screen body of the multiple screen bodies, $P_i$ is a dot spacing in the first direction, of the ith screen body, $P_{M-1}$ is a dot spacing in the first direction, of an (M−1)th screen body;
the input size meets a following formula:
$D_{in\_total}' = H_{in\_total} - 1$, where $D_{in\_total}'$ is the input size in the first direction, of the input source, $H_{in\_total}$ is the resolution in the first direction, of the input source; and
the image scaling ratio meets a following formula:

$$Ratio_{total}' = \frac{D'_{in\_total}}{D'_{out\_total}},$$

where $Ratio_{total}'$ is the image scaling ratio in the first direction, of the splice display screen.

5. The image display method as claimed in claim 1, wherein the first direction comprises a horizontal direction or a vertical direction of the splice display screen.

6. An image display method, which is applied to a splice display screen comprised by splicing multiple screen bodies along a first direction, the image display method comprising:
   determining according to specification parameters of the multiple screen bodies, an output size in the first direction, of the splice display screen, wherein the specification parameters of the multiple screen bodies comprise resolutions, and the resolutions in the first direction, of the multiple screen bodies are different;

determining according to a resolution of the input source, an input size in the first direction, of an input source;

determining according to the input size and the output size, an image scaling ratio in the first direction, of the splice display screen, so that image scaling ratios in the first direction, of the multiple screen bodies are respectively equal to the image scaling ratio in the first direction, of the splice display screen; and determining according to the image scaling ratio in the first direction, of the splice display screen, display control parameters of each screen body;

wherein determining according to the image scaling ratio in the first direction, of the splice display screen, the display control parameters of the each screen body comprises:

calculating by a following formula, the display control parameters of any screen body of the multiple screen bodies except a starting screen body:

$StartPos_i = EndPos_{i-1} + P_{i-1} \times Ratio_{total}'$, $CropHStart_i = \lfloor StartPos_i \rfloor$, $EndPos_i = StartPos_i + (Hout_i - 1) \times P_i \times Ratio_{total}'$, $CropHin_i = \lceil EndPos_i \rceil - \lfloor StartPos_i \rfloor + 1$, $InitPhase_i = \{StartPos_i\}$, where i is a natural number, $StartPos_i$ is a starting pixel position in the first direction, of the ith screen body of the multiple screen bodies except the starting screen body, $EndPos_{i-1}$ is an ending pixel position in the first direction, of an (i−1)th screen body before the ith screen body, $P_{i-1}$ is a dot spacing in the first direction, of the (i−1)th screen body, $Ratio_{total}'$ is the image scaling ratio in the first direction, of the splice display screen, $CropHstart_i$ is a starting pixel in the display control parameters in the first direction, of the ith screen body, $EndPos_i$ is an ending pixel position in the first direction, of the ith screen body, $Hout_i$ is a resolution in the first direction, of the ith screen body, $P_i$ is a dot spacing in the first direction, of the ith screen body, $CropHin_i$ is the number of pixels in the display control parameters in the first direction, of the ith screen body, $InitPhase_i$ is an initial phase in the display control parameters in the first direction, of the ith screen body, $\lfloor \ \rfloor$ is a round-down operation, $\lceil \ \rceil$ is a round-up operation, and $\{ \ \}$ is an operation of taking a decimal part.

7. The image display method as claimed in claim 6, wherein the first direction comprises a horizontal direction or a vertical direction of the splice display screen.

8. The image display method as claimed in claim 6, the image display method further comprising:

intercepting, by the each screen body, corresponding image data from the input source according to the respective image scaling ratio and the display control parameters, and implementing scaling for the image data to allow a screen body to display.

9. A video processing device, which is configured to drive a splice display screen comprised by splicing multiple screen bodies along a first direction; the video processing device comprising a processor module; the processor module storing a program code and comprising a microcontroller; the microcontroller implementing the program code, for: determining according to resolutions and dot spacings in the first direction, of the multiple screen bodies, an output size in the first direction, of the splice display screen; determining according to a resolution in the first direction, of the input source, an input size in the first direction, of an input source; determining according to the input size and the output size, an image scaling ratio in the first direction of the splice display screen; and determining according to the image scaling ratio, display control parameters in the first direction, of the each screen body, wherein the image scaling ratios in the first direction, of the multiple screen bodies are identical and equal to the image scaling ratio in the first direction, of the splice display screen;

wherein determining according to the image scaling ratio, the display control parameters in the first direction of the each screen body comprises:

calculating by a following formula, the display control parameters of any screen body of the multiple screen bodies except a starting screen body:

$StartPos_i = EndPos_{i-1} + P_{i-1} \times Ratio_{total}'$, $CropHStart_i = \lfloor StartPos_i \rfloor$, $EndPos_i = StartPos_i + (Hout_i - 1) \times P_i \times Ratio_{total}'$, $CropHin_i = \lceil EndPos_i \rceil - \lfloor StartPos_i \rfloor + 1$, $InitPhase_i = \{StartPos_i\}$, where i is a natural number, $StartPos_i$ is a starting pixel position in the first direction, of the ith screen body of the multiple screen bodies except the starting screen body, $EndPos_{i-1}$ is an ending pixel position in the first direction, of an (i−1)th screen body before the ith screen body, $P_{i-1}$ is a dot spacing in the first direction, of the (i−1)th screen body, $Ratio_{total}'$ is the image scaling ratio in the first direction, of the splice display screen, $CropHStart_i$ is a starting pixel in the display control parameters in the first direction, of the ith screen body, $EndPos_i$ is an ending pixel position in the first direction, of the ith screen body, $Hout_i$ is a resolution in the first direction, of the ith screen body, $P_i$ is a dot spacing in the first direction, of the ith screen body, $CropHin_i$ is the number of pixels in the display control parameters in the first direction, of the ith screen body, $InitPhase_i$ is an initial phase in the display control parameters in the first direction, of the ith screen body, $\lfloor \ \rfloor$ is a round-down operation, $\lceil \ \rceil$ is a round-up operation, and $\{ \ \}$ is an operation of taking a decimal part.

10. The video processing device as claimed in claim 9, wherein the display control parameters in the first direction, of the each screen body comprise a starting pixel, the number of pixels and an initial phase in the first direction, of image data intercepted by the each screen body from the input source.

11. The video processing device as claimed in claim 9, wherein determining according to the image scaling ratio, the display control parameters of the each screen body comprises:

determining display control parameters in the first direction, of a second screen body of the multiple screen body except a starting screen body, comprising:

determining a starting pixel position in the first direction, of the second screen body according to an ending pixel position and a dot spacing of a screen body before the second screen body and the image scaling ratio in the first direction, of the splice display screen, and rounding down the starting pixel position to obtain a starting pixel in the display control parameters in the first direction, of the second screen body;

determining an ending pixel position in the first direction, of the second screen body according to the starting pixel position, a resolution and a dot spacing in the first direction, of the second screen body and the image scaling ratio in the first direction, of the splice display screen;

determining the number of pixels in the display control parameters in the first direction, of the second screen body according to the ending pixel position and the starting pixel position in the first direction, of the second screen body; and taking a decimal part for the starting pixel position in the first direction, of the second screen body to obtain an initial phase in the display control parameters in the first direction, of the second screen body.

* * * * *